United States Patent
Friesen et al.

(10) Patent No.: US 9,269,995 B2
(45) Date of Patent: Feb. 23, 2016

(54) ELECTROCHEMICAL CELL WITH CATCH TRAY

(75) Inventors: Cody A. Friesen, Fort McDowell, AZ (US); Ramkumar Krishnan, Gilbert, AZ (US); Grant Friesen, Fountain Hills, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 583 days.

(21) Appl. No.: 13/185,658

(22) Filed: Jul. 19, 2011

(65) Prior Publication Data

US 2012/0015264 A1     Jan. 19, 2012

Related U.S. Application Data

(60) Provisional application No. 61/365,645, filed on Jul. 19, 2010.

(51) Int. Cl.
| | |
|---|---|
| *H01M 4/02* | (2006.01) |
| *H01M 4/12* | (2006.01) |
| *H01M 4/64* | (2006.01) |
| *H01M 4/80* | (2006.01) |
| *H01M 4/86* | (2006.01) |
| *H01M 8/06* | (2006.01) |
| *H01M 12/02* | (2006.01) |
| *H01M 2/38* | (2006.01) |

(Continued)

(52) U.S. Cl.
CPC ............ *H01M 12/02* (2013.01); *H01M 2/38* (2013.01); *H01M 12/08* (2013.01); *H01M 2/40* (2013.01); *H01M 12/085* (2013.01)

(58) Field of Classification Search
USPC ................. 429/408–427, 523–534
See application file for complete search history.

(56) References Cited

U.S. PATENT DOCUMENTS

| | | | |
|---|---|---|---|
| 3,717,505 A | 2/1973 | Unkle, Jr. et al. | |
| 3,907,603 A * | 9/1975 | Kocherginsky et al. | ...... 429/404 |
| 4,039,729 A | 8/1977 | Benczur-Urmossy et al. | |

(Continued)

FOREIGN PATENT DOCUMENTS

| | | |
|---|---|---|
| GB | 1028548 A | 5/1966 |
| JP | 7-120537 B | 12/1995 |
| WO | 2011/047105 A1 | 4/2011 |

OTHER PUBLICATIONS

International Search Report and Written Opinion for PCT International Patent Application No. PCT/US2011/044434, mailed on Nov. 2, 2011, pp. 1-10.

(Continued)

*Primary Examiner* — Basia Ridley
*Assistant Examiner* — Caitlin Wilmot
(74) *Attorney, Agent, or Firm* — Pillsbury Winthrop Shaw Pittman, LLP

(57) ABSTRACT

An electrochemical cell includes a fuel electrode configured to operate as an anode to consume a fuel when the fuel electrode and an associated cathode are connected to a load. An ionically conductive medium either present or flowing through the electrochemical cell is configured to conduct ions and participate in electrochemical reactions between the anode and the cathode. The cell further includes a catch tray containing catalyst material to induce the ionization of precipitates of fuel and/or fuel additives that may separate in solid form from the fuel electrode. The catch tray may be positioned to prevent a congestion of the precipitates in the ionically conductive medium, or the waste of electrically disconnected fuel and/or additives.

38 Claims, 15 Drawing Sheets

(51) Int. Cl.
*H01M 12/08* (2006.01)
*H01M 2/40* (2006.01)

(56) References Cited

U.S. PATENT DOCUMENTS

| | | |
|---|---|---|
| 2009/0284229 A1 | 11/2009 | Friesen et al. |
| 2010/0119895 A1 | 5/2010 | Friesen |
| 2010/0285375 A1 | 11/2010 | Friesen et al. |
| 2010/0316935 A1 | 12/2010 | Friesen et al. |
| 2011/0039181 A1 | 2/2011 | Friesen et al. |
| 2011/0070506 A1 | 3/2011 | Friesen et al. |
| 2011/0086278 A1 | 4/2011 | Friesen et al. |
| 2011/0189551 A1 | 8/2011 | Friesen et al. |
| 2011/0200893 A1 | 8/2011 | Friesen et al. |
| 2011/0250512 A1 | 10/2011 | Friesen et al. |
| 2011/0305959 A1 | 12/2011 | Friesen et al. |
| 2011/0316485 A1 | 12/2011 | Krishnan et al. |

OTHER PUBLICATIONS

Intl. Preliminary Report on Patentability dated Jan. 25, 2013 of PCT/US11/44434 filed Jul. 19, 2011 (4 pages).
Chinese Office Action dated Dec. 29, 2014 for Appln. No. 201180035526.8.

\* cited by examiner

ELECTROCHEMICAL CELL WITH CATCH TRAY

This application claims priority to U.S. Provisional Application Ser. No. 61/365,645, filed Jul. 19, 2010, the entire contents thereof which is incorporated herein by reference.

FIELD

The present invention is generally related to electrochemical cells.

BACKGROUND

Electrochemical cells may be of a flooded or "wet" configuration, utilizing a liquid electrolyte to conduct ions and support electrochemical reactions between an anode and a cathode. Although some electrochemical cells, such as those in the lead-acid batteries may utilize a static amount of electrolyte in a pool, other electrochemical cells may utilize a flow configuration. In such a flow configuration, electrolyte may flow through the cell, potentially from and/or to a reservoir configured to hold an excess of electrolyte. Flooded electrochemical cells of both flow or static configurations may be of numerous types, including but not limited to lead-acid, metal-air, Ni—Zn, Ag—Zn, and Ni—Cd. One example of a metal-air electrochemical cell typically comprises a fuel electrode serving as the anode, at which metal fuel is oxidized, and an oxidant electrode that serves as an air breathing cathode, at which oxygen from ambient air is reduced. An electrolyte of the cell may support reactions of the oxidized/reduced ions. For example, see U.S. Patent Application Publication No. 2009/0284229, incorporated in its entirety herein by reference.

In some electrochemical cells, particulates or precipitates of the metal fuel may detach from the fuel electrode, either during consumption of the metal fuel during a discharge mode, or when the metal fuel is being reduced onto the fuel electrode during a recharge mode. This loss of active material may lead to reduced capacity of the battery, thereby reducing its lifetime. Furthermore, any active material that detaches and flows in the electrolyte in flow configuration cells may collect/agglomerate in a way that may short electrodes in the cell, thereby affecting battery/cell performance. Various attempts at managing these particulates and/or precipitates in electrochemical cells are known. For example, one such device is shown in U.S. patent application Ser. No. 12/901,410, published as U.S. Patent Application Publication No. 2011/0086278, incorporated in its entirety herein by reference.

The present application also endeavors to provide an effective and improved way of reclaiming fuel in the form of precipitates or particles that separate from the fuel electrode, to reduce precipitate congestion in the cell and retain the capacity and performance of the cell.

SUMMARY

According to an aspect of the present invention, there is provided an electrochemical cell that includes a fuel electrode comprising a metal fuel, an oxidant electrode spaced from the fuel electrode, an ionically conductive medium for conducting ions between the fuel and oxidant electrodes to support electrochemical reactions at the fuel and oxidant electrodes; and a catch tray positioned to be contacted by particulates of the metal fuel separating from the fuel electrode. The fuel electrode and the oxidant electrode are configured to, during discharge, oxidize the metal fuel at the fuel electrode and reduce an oxidant at the oxidant electrode to generate a discharge potential difference therebetween for application to a load. The catch tray comprises a catalyst material for catalyzing, locally at the catch tray, oxidation of particulates of the metal fuel contacting the catch tray, and reduction of cations in the ionically conductive medium.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1A:
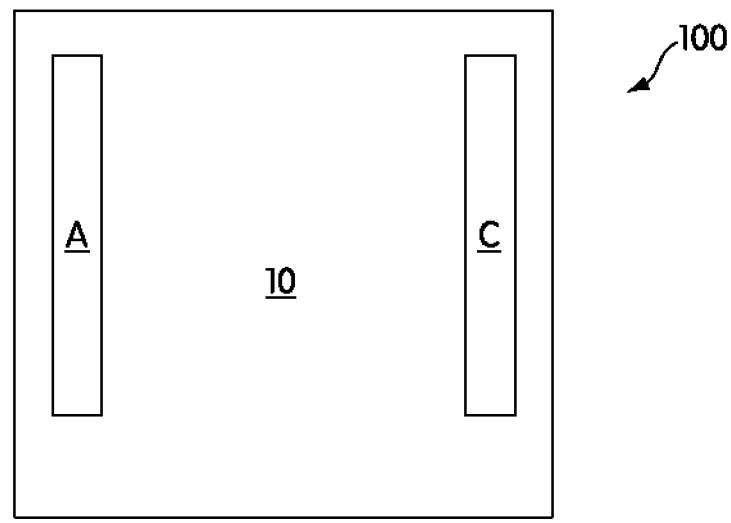
FIGS. 1A and 1B illustrate schematic views of a flooded/non-pasted electrochemical cell having a static and a flow configuration respectively.
Figure 1B:
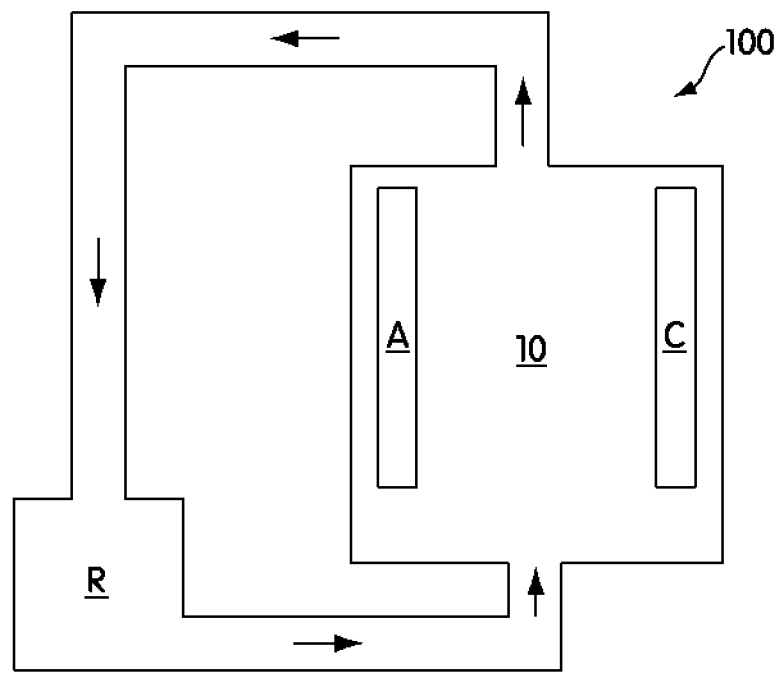

FIGS. 1A and 1B schematically illustrate generic electrochemical cell systems 100, each comprising a single electrochemical cell 10. As shown in FIG. 1A, the cell system 100 may be of a flooded (i.e. wet) or other non-pasted cell configuration, having both an anode A and a cathode C, separated by an ionically conductive medium. As shown in FIG. 1B, the cell system 100 may also be of a flow configuration, wherein the ionically conductive medium may flow out of the cell 10 into a reservoir R of excess ionically conductive medium, which may be replenished as needed. The flow configuration may be driven by a flow pump FP, not shown, which is described in greater detail below.

Figure 2:
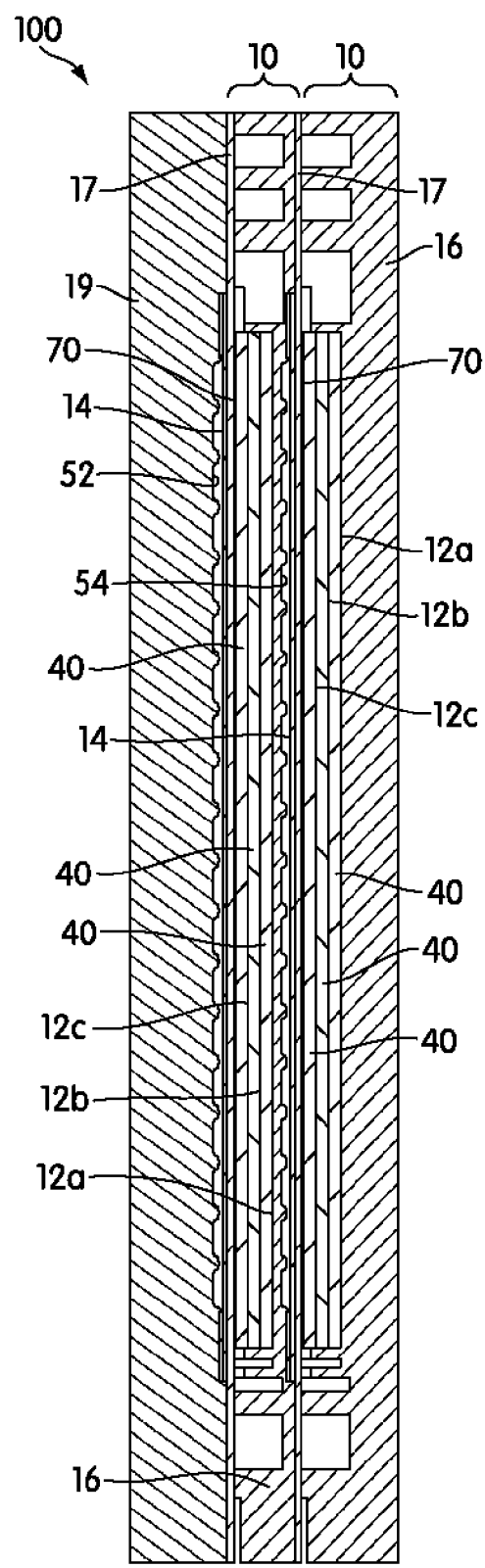
FIG. 2 illustrates a cross-sectional view of an electrochemical cell system having a flow configuration that includes two electrochemical cells.
Figure 3:
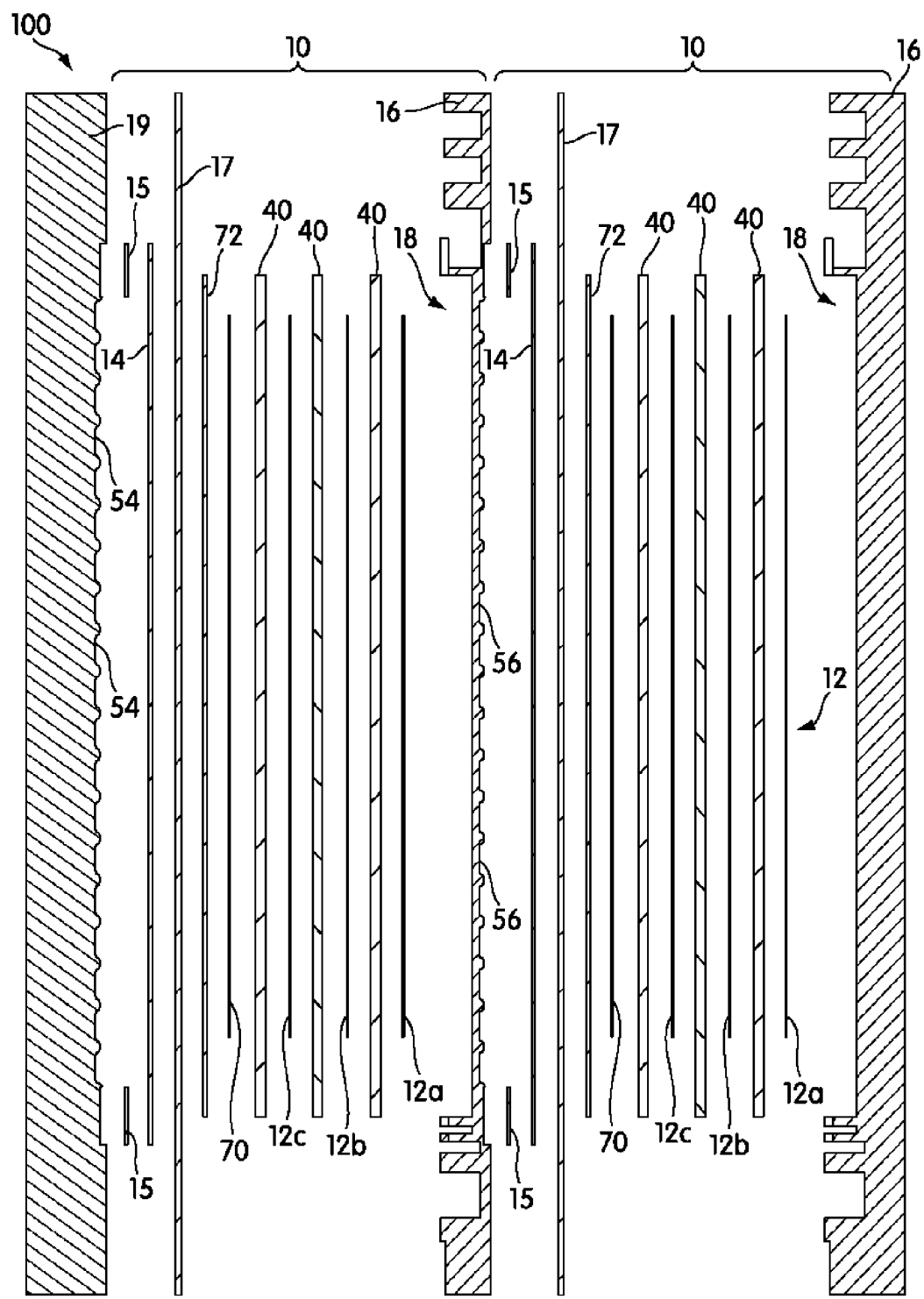
FIG. 3 illustrates an exploded view of the electrochemical cell system of FIG. 2.

FIGS. 2 and 3 illustrate an electrochemical cell system 100 of a configuration similar to the generic flow configuration of FIG. 1B. The electrochemical cell system 100 of FIGS. 2 and 3 includes two electrochemical cells 10 according to an embodiment of the invention. As illustrated, each cell 10 includes a fuel electrode 12, and an oxidant electrode 14 that is spaced from the fuel electrode 12. The fuel electrode 12 supported by an electrode holder 16. The electrochemical system 100 also includes a cover 19 that is used to cover the electrochemical cells 10 on one side of the system 100, while one of the electrode holders 16 is used to cover the opposite side of the system 100, as illustrated in FIG. 2.

In an embodiment, the fuel electrode 12 is a metal fuel electrode that functions as an anode when the cell 10 operates in discharge, or electricity generating, mode, as discussed in further detail below. In an embodiment, the fuel electrode 12 may comprise a permeable electrode body 12a, such as a screen that is made of any formation able to capture and retain, through electrodepositing, or otherwise, particles or ions of metal fuel from an ionically conductive medium that circulates in the cell 10, as discussed in further detail below.

In various embodiments, the fuel of the cell 10 may be a metal such as but not limited to iron, zinc, aluminum, magnesium, nickel, lithium, lead, and cadmium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 10 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is aqueous potassium hydroxide. In other embodiments, the electrolyte can be acidic. For example, where the cell is of a lead-acid configuration, the electrolyte may comprise sulfuric acid.

The fuel may be oxidized at the fuel electrode 12 when the fuel electrode 12 is operating as an anode, and an oxidizer, such as oxygen, may be reduced at the oxidant electrode 14 when the oxidant electrode 14 is operating as a cathode, which is when the cell 10 is connected to a load and the cell 10 is in discharge or electricity generation mode, as discussed in further detail below. The reactions that occur during discharge mode generate by-product precipitates, e.g., a reducible fuel species, in the ionically conductive medium. For example, in embodiments where the fuel is zinc, zinc oxide is generated as a by-product precipitate/reducible fuel species. During a recharge mode, which is discussed in further detail below, the by-product precipitates, e.g., zinc oxide, may be reversibly reduced and deposited as the fuel, e.g., zinc, onto the fuel electrode 12, which functions as a cathode during recharge mode. During recharge mode, either the oxidant electrode 14, or a separate charging electrode 70, described below, functions as the anode. The switching between discharge and recharge modes is discussed in further detail below.

Figure 4:
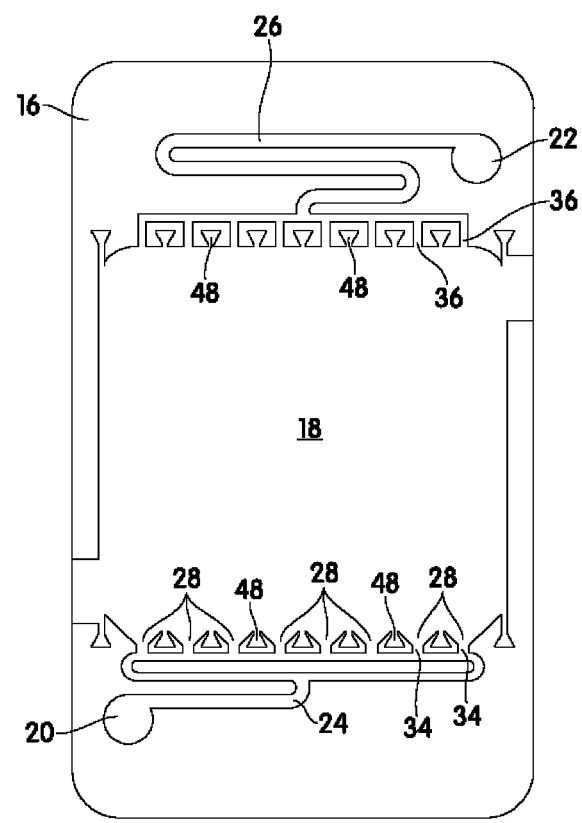
FIG. 4 illustrates an electrode holder of one of the electrochemical cells of FIG. 2.

The electrode holder 16 defines a cavity 18 in which the fuel electrode 12 is held. The electrode holder 16 also defines an inlet 20 and an outlet 22 for the cell 10. The inlet 20 is configured to allow the ionically conductive medium to enter the cell 10 and/or recirculate through the cell 10. The inlet 20 may be connected to the cavity 18 via an inlet channel 24, and the outlet 22 may be connected to the cavity 18 via an outlet channel 26. As illustrated in FIG. 4, the inlet channel 24 and the outlet channel 26 may each provide a meandering tortuous path through which the ionically conductive medium may flow. The meandering path defined by the inlet channel 24 preferably does not include any sharp corners in which the flow of the medium may become stagnated or in which any particulates in the medium may collect. As discussed in further detail below, the length of the channels 24, 26 may be designed to provide an increased ionic resistance between cells that are fluidly connected in series.

For each cell 10, a permeable seal member 17 may be bonded between sealing surfaces on the electrode holders 16 and/or the cover 19, as appropriate, to enclose at least the fuel electrode 12 in the cavity 18. The seal member 17 also covers the inlet and outlet channels 24, 26. The seal member 17 is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member 17 for enabling ion conductivity with the oxidant electrode 14 on the opposing side to support the electrochemical reactions, without "wicking" the ionically conductive medium laterally outwardly from the cell 10. A few non-limiting examples of a suitable material for the seal member 17 are EPDM and TEFLON®.

In the illustrated embodiment, the cavity 18 has a generally rectangular, or square, cross-section that substantially matches the shape of the fuel electrode 12. In an embodiment, such as that seen in FIGS. 4, 5, and 8, one side of the cavity 18, specifically, the side of the cavity 18 that is connected to the inlet channel 24, includes a plurality of fluidization zones 28 that are each connected to the inlet channel 24 via a manifold that includes a plurality of cavity inlets 34 so that when the ionically conductive medium and precipitates or reducible fuel species enter the cavity 18, the ionically conductive medium and fuel enter the fluidization zones 28. As shown in greater detail in FIG. 8, each fluidization zone 28 is partially defined by two surfaces 30, 32 that are angled with respect to each other but do not touch each other so as to define diverging surfaces with respect to an axis that extends from the inlet 34 through the center of the fluidization zone 28. In the non-limiting illustrated embodiment, the surfaces 30, 32 substantially define a "V" with an open bottom that is open to the inlet 34, as illustrated in FIG. 4. Although the illustrated embodiment shows the surfaces 30, 32 as being relatively straight, the surfaces may be curved or partially curved, so long as the surfaces 30, 32 are diverging from the inlet 34. In some embodiments, the inlet channels 34 can be any other suitable shape, including but not limited to vertically oriented, slanted, or curved.

Figure 8:
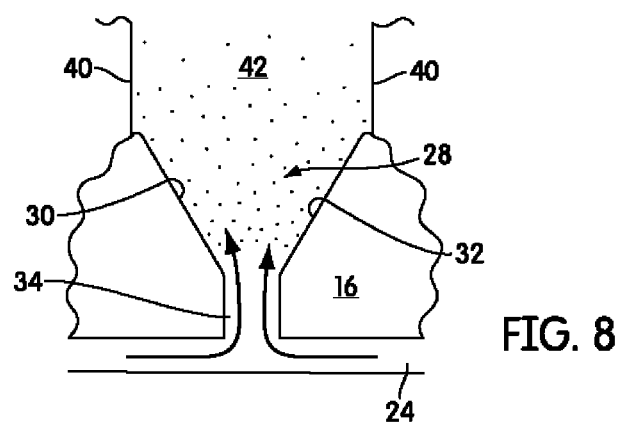
FIG. 8 illustrates a fluidization zone defined in part by the electrode holder of FIG. 4 in greater detail.

The fluidization zones 28 are configured so that as the ionically conductive medium with particulates flows into the cavity 18 via the inlet channel 24, the particulates are fluidized in the ionically conductive medium, which allows for the particulates to be more evenly dispersed in the ionically conductive medium as the ionically conductive medium contacts the fuel electrode 12. This is particularly advantageous when the electrochemical cell 10 is oriented with the open bottom of the V-shaped fluidization zones 28 is pointed downward, as illustrated in FIG. 8. This is because gravity will tend to cause the particulates to accumulate at the inlet end of the cavity 18 between the inlet channel 24 and the outlet channel 26. By fluidizing the particulates in the ionically conductive medium, and by providing a pressure drop across the cavity 18, as discussed in further detail below, the particulates will flow more evenly across the cavity 18, with substantially less or no accumulation at the inlet end of the cavity 18. This may improve the efficiency of the cell 10 by providing a more even distribution of the particulates across the surface of the fuel electrode 12. As discussed below, however, the fluidization zones 28 are optional in the present invention, and other mechanisms of particulate management may be utilized, either in conjunction with or instead of them.

Figure 5:
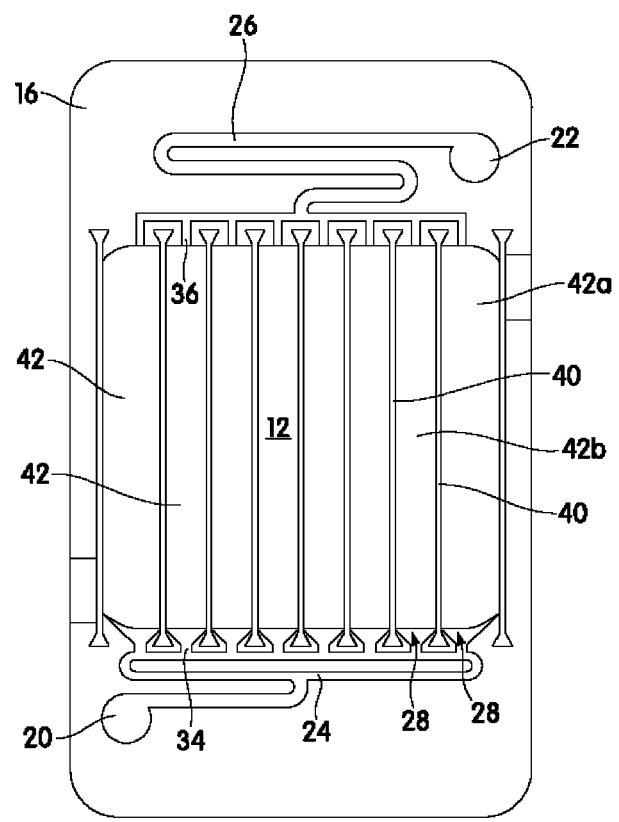
FIG. 5 illustrates the electrode holder of FIG. 4 holding a fuel electrode and a plurality of spacers connected to the electrode holder.

As illustrated in FIG. 5, a plurality of spacers 40, each of which extends across the fuel electrode 12 in a spaced relation to each other, may be connected to the electrode holder 16 so that the fuel electrode 12 may be held in place relative to the electrode holder 16 and to the oxidant electrode 14. In an embodiment, the fuel electrode 12 may contain a plurality of permeable electrode bodies 12a-12c, as illustrated in FIG. 3, that may be separated by sets of the plurality of spacers 40, so that each set of spacers 40 is positioned in between adjacent electrode bodies to electrically isolate the electrode bodies 12a-12c from each other. Within each set of spacers 40 between adjacent electrode bodies, the spacers 40 are positioned in a spaced relation in a manner that creates so-called "flow lanes" 42 therebetween, as discussed in greater detail below. The flow lanes 42 are three-dimensional and have a height that is substantially equal to the height of the spacers 40. In an embodiment, the spacers may be provided by a single frame that has cut-outs corresponding to the flow lanes. In an embodiment, the flow lanes may include a foam or honeycomb-type structure that is configured to allow the ionically conductive medium to flow therethrough. In an embodiment, the flow lanes may include an array of pins that are configured to disrupt the flow of the ionically conductive medium through the flow lanes. The illustrated embodiment is not intended to by limiting in any way.

The spacers 40 are non-conductive and electrochemically inert so they are inactive with regard to the electrochemical reactions in the cell 10. The spacers 40 are preferably sized so that when they are connected to the electrode holder 16, the spacers 40 are in tension, which allows the spacers 40 to press against the fuel electrode 12, or one of the electrode bodies 12a-12c, so as to hold the fuel electrode 12 or bodies thereof in a flat relation relative to the electrode holder 16. The spacers 40 may be made from a plastic material, such as polypropylene, polyethylene, noryl, fluoropolymer, etc. that allows the spacers 40 to be connected to the electrode holder 16 in tension.

Figure 6:
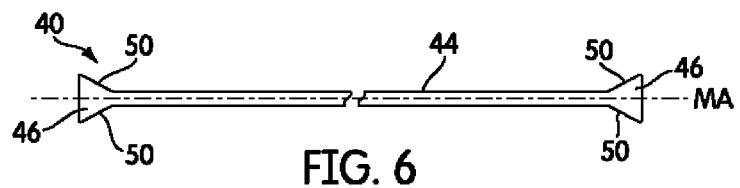
FIG. 6 illustrates one of the spacers of FIG. 5 in greater detail.
Figure 7:
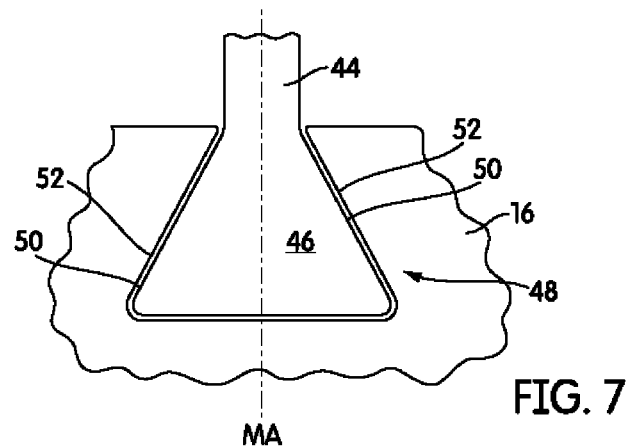
FIG. 7 illustrates a connection between the spacer of FIG. 6 and the electrode holder of FIG. 4 in greater detail.

In the embodiment illustrated in FIG. 6, each spacer has an elongated middle portion 44, and a shaped connecting portion 46 at each end. In other embodiments, the connecting portion 46 may be omitted, and the support structure for the fuel electrode 12 may be molded using epoxy or plastic. The shaped connecting portions 46 of the illustrated embodiment are configured to be held by openings 48 having substantially similar shapes in the electrode holder 16, as illustrated in FIG. 7. As shown, the shaped portions 46 and the openings 48 have a substantially triangular shape, although the illustrated shape is not intended to be limiting in any way. The substantially triangular shape provides surfaces 50 on opposite sides of the elongated portion 44 of the spacer 40 that are configured to contact corresponding surfaces 52 on the electrode holder 16. Because the surfaces 50, 52 are angled with respect to a major axis MA of the elongated portion 44 of the spacer 40 and the tension in the spacer 40 will be along the major axis MA, the forces created by the tension may be distributed across a larger surface, as compared to a shaped portion having a circular or square shape with the same area.

Once the spacers 40 have been connected to the electrode holder 16 via the end portions 46, the flow lanes 42 are defined across the cavity 18 of the electrode holder 16. The spacers 40 are configured to essentially seal off one flow lane 42a from an adjacent flow lane 42b, that is separated by one of the spacers 40 so that the ionically conductive medium is guided to generally flow in substantially one direction. Specifically, the ionically conductive medium may generally flow in a first direction FD across the fuel electrode 12, from the inlet channel 24 to the outlet channel 26. A suitable pressure drop is generated between the inlet channel 24 and the fluidization zones 28 so that the ionically conductive medium may flow across the cavity 18 and to the outlet channel 26, even when the cell 10 is oriented such that the flow is substantially upward and against gravity. In an embodiment, the ionically conductive medium may also permeate through the fuel electrode 12, or an individual permeable electrode body 12a-12c, in a second direction SD and into a flow lane that is on the opposite side of the fuel electrode 12 or permeable electrode body 12a-12c.

Figure 9A:
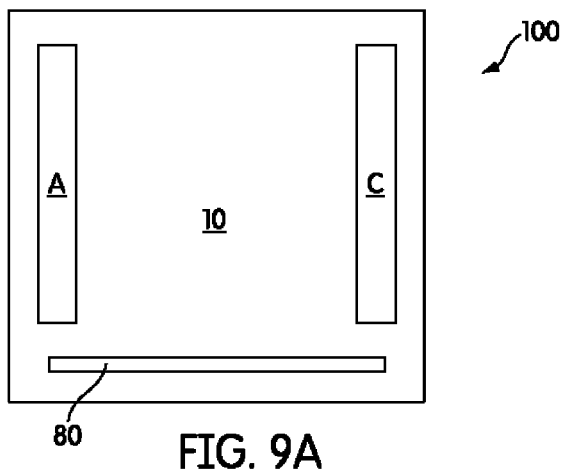
FIGS. 9A and 9B illustrate the embodiments of FIGS. 1A and 1B respectively, further comprising at least one catch tray contained therein.
Figure 9B:
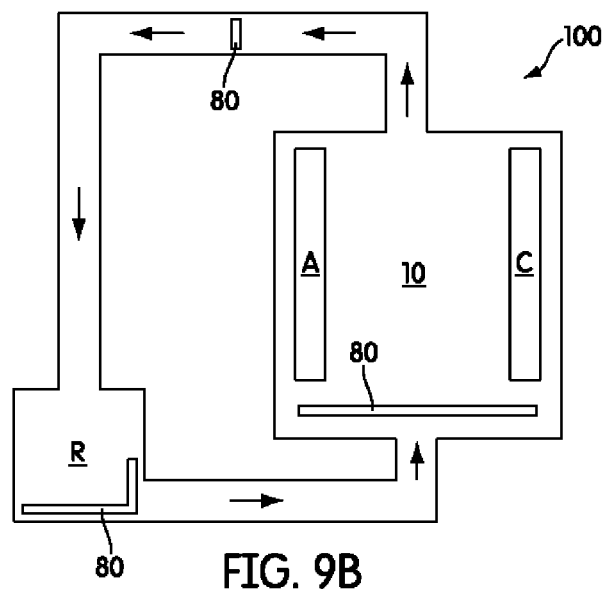

As noted above, electrochemical cells 10 may utilize other mechanisms of particulate management. As an example, the generic electrochemical cells of FIGS. 1A and 1B are shown in FIGS. 9A and 9B respectively further comprising a catch tray 80. In this context, "catch tray" may be defined as any structure on which a particulate may contact for the electrochemical reaction(s) discussed below, and does not imply any particular configuration or orientation. For example, catch tray 80 may neither be flat nor planar. Furthermore, catch tray 80 may or may not have any embellishments, such as one or more raised lips. As shown in FIG. 9A, where the cell 10 comprises a simple static configuration with the anode A and the cathode C separated by a non-flowing electrolyte, the cell 10 may comprise the catch tray 80.

The catch tray 80 may be configured to include a more noble metal than the battery active materials (i.e. those metals that participate in the electrochemical reactions in the cell), such that the catch tray 80 may form a corrosion couple with the battery active materials. The use of the more noble metal in the catch tray 80 may permit the catch tray 80 to corrode any active material that has lost contact with the current collector (i.e. the anode A or the cathode C), back into an ionic species present in the electrolyte. This may allow the ionic species to be reutilized in the cell 10 during future electrochemical reactions. Additionally, the positioning of the catch tray 80 may prevent active material that has lost contact with the current collector from congesting or collecting in an area that is disadvantageous to the operation of the cell 10. The potential of harm from congestion of active material may be especially pronounced in flow configurations of the cell 10, such as that shown generically in FIG. 1B. As shown in FIG. 9B, catch trays 80 may be positioned in one or more locations throughout the cell system 100, such as, for example, below the anode A and cathode C of the cell 10, along the flow path outside of the cell 10, and/or in the reservoir R, such as at the bottom of the reservoir R.

In some embodiments, the cell 10 may include one or more inorganic additives, that may be added to the electrolyte and form part of the active material during the charging of the cell 10. As above, where the active material disconnects from the current collector, the catch tray 80 may receive the active material, and corrode the additive back to an ionic species in electrolyte. In various embodiments, metals such as indium, bismuth, lead, and antimony may be utilized as an additive in the cell 10 to enhance performance, and can be converted back to oxidized species in the electrolyte of the cell 10 by the catch tray 80 in the event that the active material containing the inorganic additive separates from the current collector.

Figure 10:
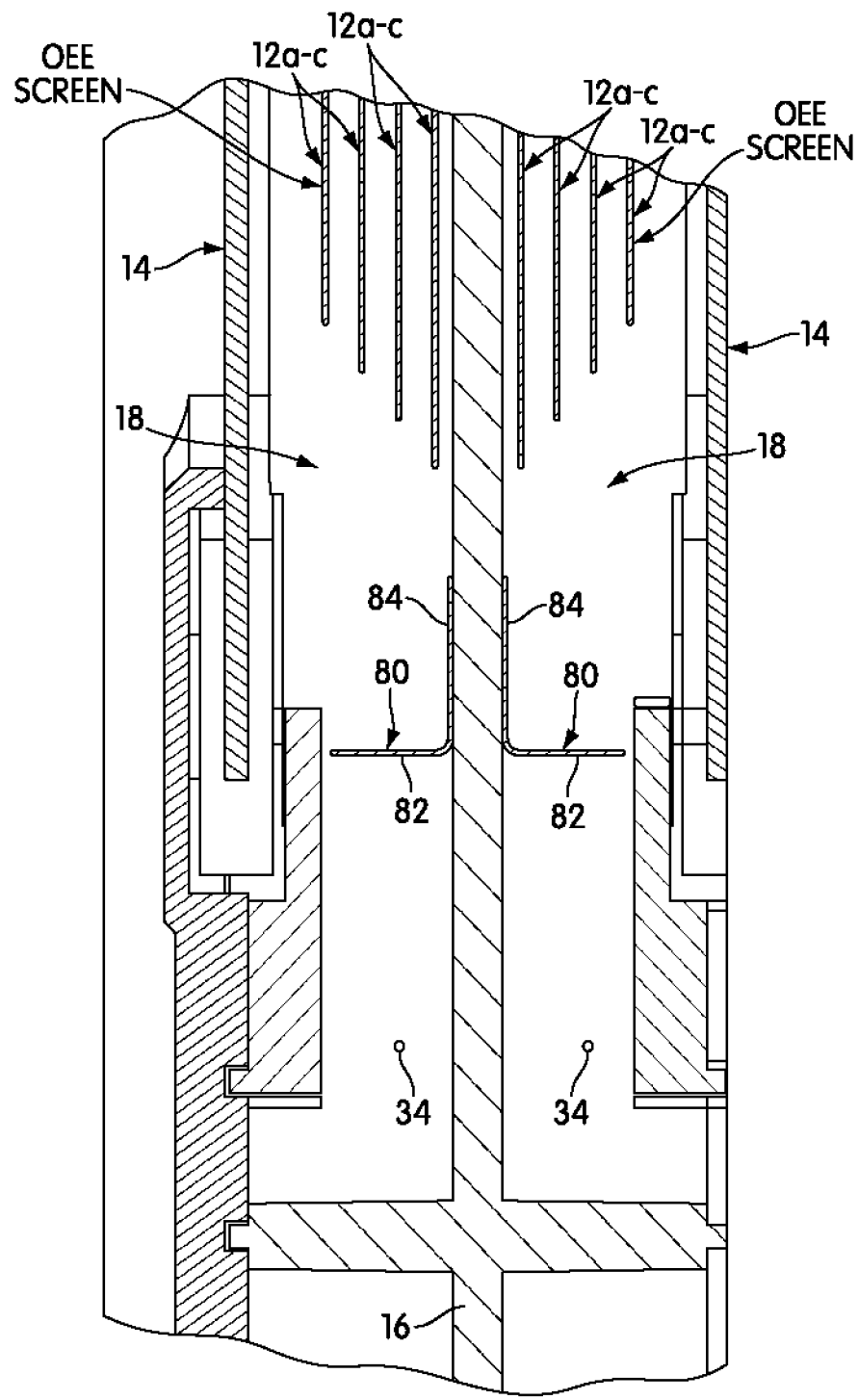
FIG. 10 illustrates a partial cross-sectional view of an embodiment of an electrochemical cell system of FIG. 2 further comprising a catch tray mounted to an electrode holder.

Although the catch tray 80 may be utilized in any sort of cell 10, including both the static cell system 100 of FIG. 9A that utilizes a non-flowing pooled electrolyte, or a flow configuration cell system 100 of FIG. 9B, the catch tray 80 will be described in greater detail below as implemented in the embodiment of FIG. 2, wherein the cell 10 comprises a fuel electrode 12 comprising a plurality of electrode bodies 12a-c. For example, shown in FIG. 10 is a cross sectional view of the cell 10, showing the fuel electrode 12 in the cavity 18, as well as the inlet 34. Positioned between the inlet 34 and the cavity 18 there is provided a catch tray 80. Whereas the fluidization zones 28 of the embodiment of FIG. 2 are configured to fluidize the particulates in the ionically conductive medium to permit a more even dispersal in the ionically conductive medium as it contacts the fuel electrode 12, the catch tray 80 is configured to promote oxidation of particulates back into the ionically conductive medium, as is discussed in greater detail below, so as to prevent their congestion in the flow path of the ionically conductive medium.

In such an embodiment of the cell 10, the catch tray 80 may be configured to receive particulates that may separate from the electrode bodies 12a-c of the fuel electrode 12. For example, the catch tray 80 may be positioned between the fuel electrode 12 and the inlet 34. If particulates between the electrode bodies 12a-c succumb to gravitational forces, and fall against the flow of the ionically conductive medium towards the inlets 34, the catch tray 80 may prevent the particulates from gathering by the inlets 34. As shown, the catch tray 80 may comprise a particulate contacting portion 82 and a mounting portion 84. In an embodiment, the particulate contacting portion 82 may be configured so that it is between the inlet 34 of the flow and each of the electrode bodies 12a-c. In an embodiment, wherein the flow is directed through a portion of the catch tray 80, such as the particulate contacting portion 82 in the illustrated embodiment, the portion may be constructed of a porous material, or shaped to have a porous configuration, so that the flow may continue through the catch tray 80. In an embodiment, pores of the porous material in the particulate contacting portion 82 may be sized to optimize both flow through the particulate contacting portion 82 and the likelihood that that particulates will contact the particulate contacting portion 82. In an embodiment, the pores are approximately 10 μm-1000 μm in size. Pores in the particulate contacting portion 82 may also be of different sizes. For example, in an embodiment the pores may be bimodal, such as having a primary pore size in the range of 10 μm-1000 μm and a secondary pore size in the range 0.01 μm to 1 μm. Preferably, the catch tray has a high internal surface area 100-1000× that of the apparent surface area, which may enable rapid corrosion/oxidation of fuel particles In an embodiment, the catch tray 80 may comprise a catalyst material, so that when the particulates separated from the electrode bodies 12a-c of the fuel electrode 12 contact the particulate contacting portion 82 of the catch tray 80, the particulates are oxidized, while cations, such as hydrogen cations ($H^+$) in the ionically conductive medium are reduced. In an embodiment, the catalyst material may raise the oxidation potential of the particulates, and/or lower the reduction potential of hydrogen ions in the ionically conductive medium to permit a local reduction-oxidation reaction at the catch tray 80. Both changes in potential may occur in the presence of the catalyst, as the catalyst material is electrochemically more of a noble metal than the metal fuel. In other words, the catalyst material may lower the activation energy for the reduction-oxidation reaction to occur between the particulates and hydrogen ions in the ionically conductive medium. In an embodiment, the material structure of the catalyst on a molecular scale may be selected or engineered to promote the oxidation of the particulates. For example, the catalyst material may provide a surface upon which reactants such as the particulates and the hydrogen ions may adsorb onto, and at which the reduction and oxidation reactions may occur with a lower activation energy, before desorption occurs of the reaction products.

In an embodiment, the catalyst material is contained within the particulate contacting portion 82 of the catch tray 80, while the mounting portion 84 does not participate in any of the electrochemical reactions in the cell. For example, in embodiments wherein the metal fuel, and the loose particulates thereof, are zinc, the catalyst material may be any more noble metal, such that the zinc and the catalyst material may form a couple to corrode the zinc by the oxidation reaction $Zn+H_2O \rightarrow ZnO+2H^++2e^-$. At the same time, hydrogen ions in the ionically conductive medium may reduce according to the complementary local reduction reaction $2H^++2e^- \rightarrow H_2$. The catalyst material of the catch tray 80 may be of any suitable material or configuration. For example, in an embodiment, the catch tray 80 may comprise or be formed from catalyst materials such as nickel, platinum, palladium, rhodium, gold, silver, or alloys, ions, or oxides thereof. In some embodiments, the catalyst material may include nickel alloys such as monel, or oxides such as perovskites. In some embodiments, the catalyst material may also be a thin film coated on another substrate such as copper, bronze or nickel. The materials are not limited to the above choices and any material more noble than the fuel can be used. In an embodiment, the catalyst material may be selected so that the electrochemical reactions in the cell 10 do not consume the catalyst material, or other portions of the catch tray 80.

The catalyst material of the catch tray 80 may be formed by any suitable process. For example, in an embodiment the catalyst material of the catch tray 80 may be formed by electroplating a catalyzing material onto a base material. In another embodiment, the catalyst material of the catch tray 80 may be formed by plasma spraying the catalyzing material onto the base material. In yet another embodiment, the catalyst material of the catch tray 80 may be molded or shaped from the catalyzing material.

As noted, in some embodiments the mounting portion 84 may not participate in the electrochemical reactions in the cell. In another embodiment, however, the mounting portion 84 may also comprise the catalyst material of the catch tray 80, and may induce the oxidation of the particulates. In an embodiment, the mounting portion 84 may be integrally connected to the particulate contacting portion 82. In an embodiment, both the mounting portion 84 and the particulate contacting portion 82 may be formed from the catalyst material, as described above.

Figure 11:
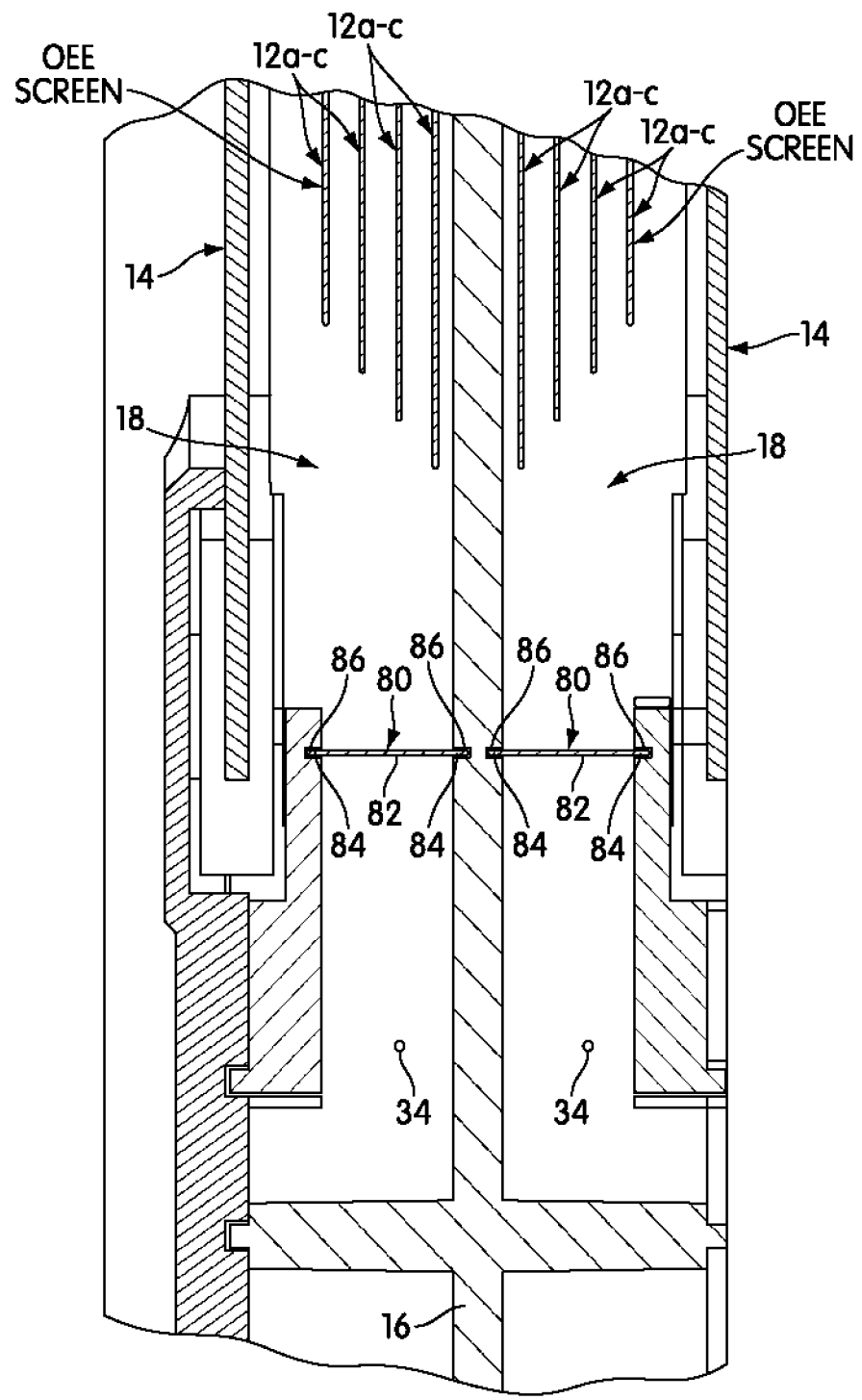
FIG. 11 illustrates an alternative embodiment of the catch tray of FIG. 10.

FIG. 10 additionally shows that in an embodiment, the catch tray 80 may be mounted to the electrode holder 16. In an embodiment, the mounting portion 84 may be connected to the electrode holder 16, while the particulate contacting portion 82 extends into the opening of the inlet 34. In another embodiment, as seen in FIG. 11, the catch tray may be received by one or more recesses 86 in the electrode holder 16. In such an embodiment, the mounting portion 84 may be considered those portions of the catch tray 80 that are received by the recesses 86.

Figure 12:
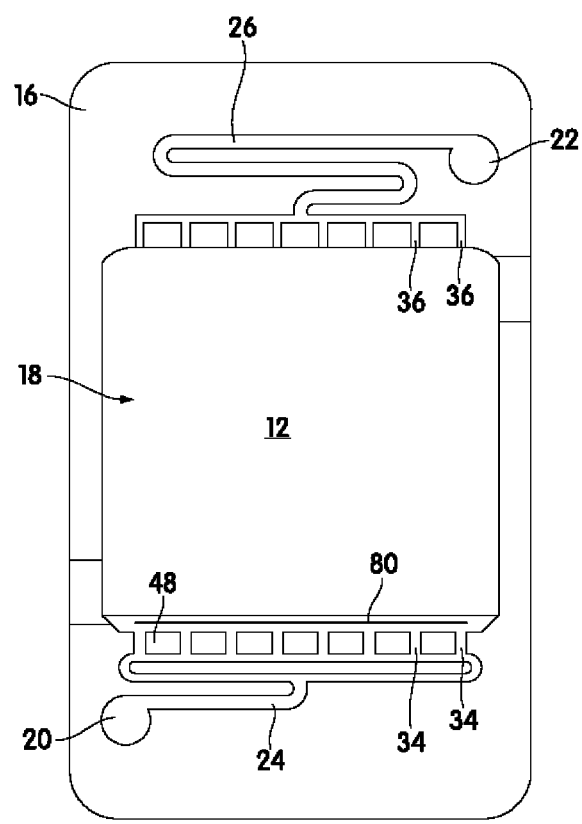
FIG. 12 illustrates an embodiment of the cell of FIG. 10, showing the electrode holder comprising an embodiment of the catch tray.
Figure 13:
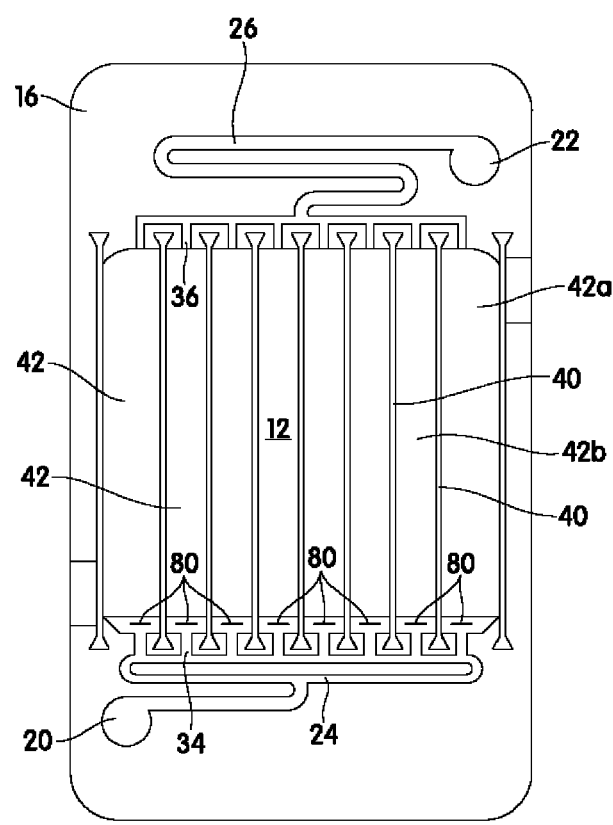
FIG. 13 illustrates an alternative embodiment of the cell of FIG. 12, comprising an alternative embodiment of the catch tray, as well as a plurality of spacers connected to the electrode holder.

Shown in FIGS. 12 and 13 are embodiments of the cell 10 that lack the fluidization zones 28 on the side of the cavity 18 that is connected to the inlet channel 24. Instead, as illustrated, the inlet 34 may lead directly into the cavity 18. As is seen in FIG. 12, wherein the cavity 18 is shown without spacers 40 defining a plurality of flow channels 42, the catch tray 80 may comprise a single body that extends along the plurality of inlets 34. In another embodiment of the cell 10, as seen in FIG. 13, wherein the cell 10, as the embodiment above, has a plurality of spacers 40, there may be a plurality of catch trays 80, each associated with one of the plurality of inlets 34. In another embodiment, not shown, the catch tray 80 may comprise a single body that extends through the spacers 40 defining the plurality of flow channels 42. In such an embodiment, the spacers 40 may be shaped to receive the catch tray 80, for example by having a notch associated with the side of the spacer 40 associated with the inlet 34.

Figure 14:
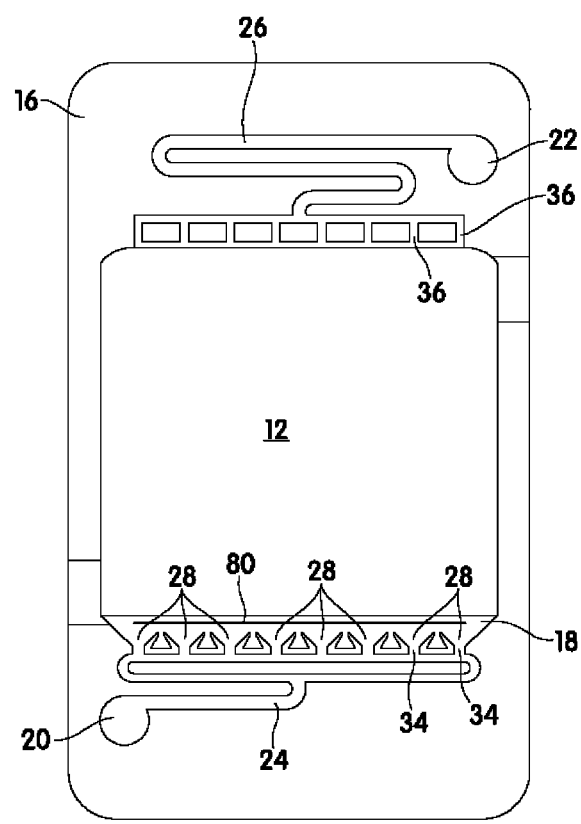
FIG. 14 illustrates an alternative embodiment of the cell of FIG. 12, comprising an alternative embodiment of the electrode holder.
Figure 15:
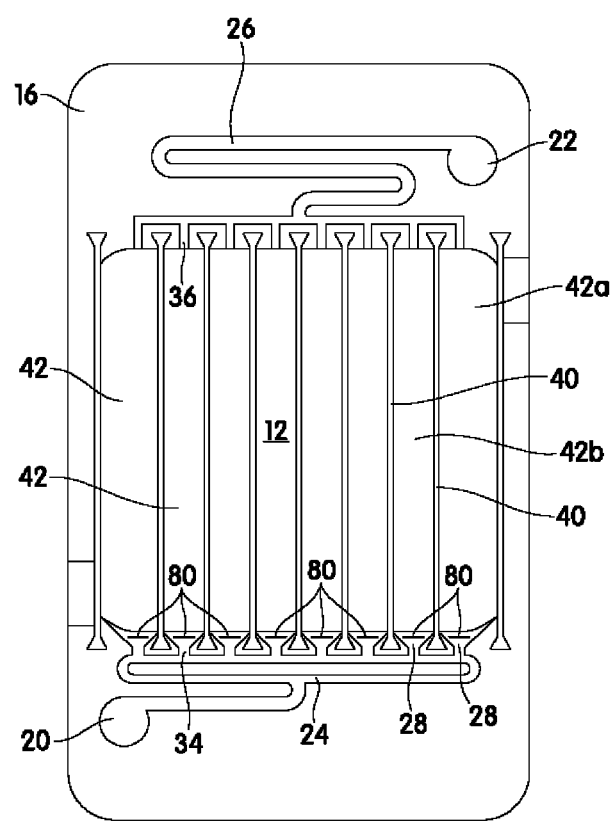
FIG. 15 illustrates an alternative embodiment of the cell of FIG. 14, comprising an alternative embodiment of the catch tray, as well as a plurality of spacers connected to the electrode holder.

In other embodiments, as seen in FIGS. 14 and 15, the cell 10 may contain multiple mechanisms of particulate management, and for example may utilize the catch tray 80 in conjunction with the fluidization zones 28 as described above. For example, in FIG. 14, the cell 10 is shown without spacers 40 defining a plurality of flow channels 42. Despite this, the flow may still enter the cavity 18 through a plurality of fluidization zones 28 adjacent to the inlets 34. As shown, the catch tray 80 may comprise a single body extending along the plurality of fluidization zones 28. In another embodiment, as seen in FIG. 15, wherein the cell 10 has both a plurality of spacers 40 defining a plurality of flow lanes 42, and wherein the inlets 34 allow the flow to enter into associated fluidization zones 28, as described above, the flow may still pass through a plurality of the catch trays 80, each associated with one of the plurality of inlets 34. In embodiment, such as, but not limited to those in FIGS. 14 and 15, each catch tray 80 may be used in conjunction with the fluidization zones 28, so that if some particulates fall from the fuel electrode 12 against the flow, and pass through the catch tray 80 (for example, the porous region of the particulate contacting portion 82 on some embodiments), then the particulate may be fluidized in the fluidization zone 28, so that it is pushed along with the flow back into contact with the catch tray 80.

Figure 16:
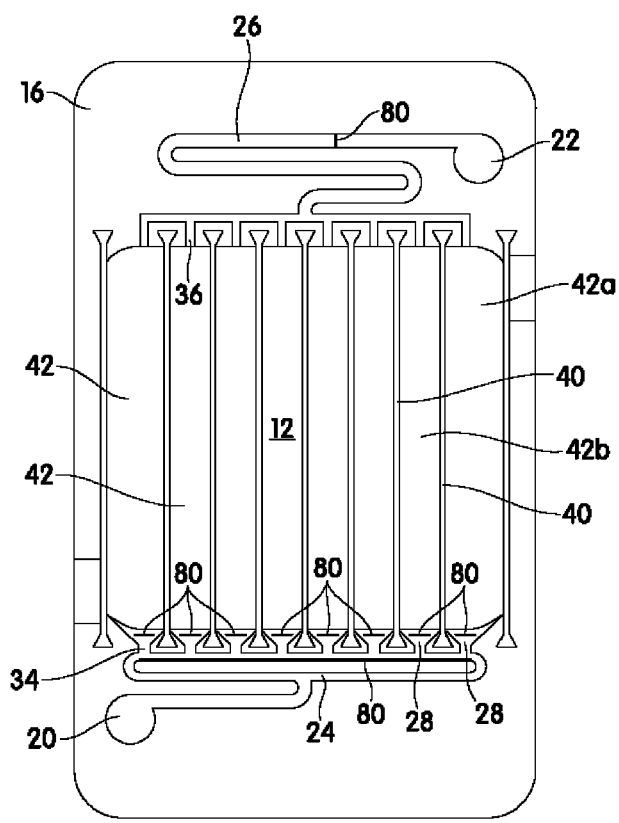
FIG. 16 illustrates another embodiment of the electrochemical cell of FIG. 15, further comprising a plurality of catch trays throughout the cell.

As is shown in FIG. 16, in an embodiment the cell 10 may contain additional catch trays 80, positioned throughout the flow path of the ionically conductive medium. For example, in the illustrated embodiment, which has a plurality of catch trays 80, each associated with one of the fluidization zones 28, the cell may further comprise a catch tray 80 positioned prior to the inlets 34 in the inlet channel 24. In such an embodiment, the catch tray 80 may catalyze the oxidation of particulates that fall from the fuel electrode 12, and pass through the catch trays 80, but are not fluidized in the fluidization zones, and fall under the force of gravity through the inlets 34. Also as shown, the catch tray 80 may be positioned in the flow path after the fuel electrode 12, which may be configured to induce the oxidation of particulates which break away from the fuel electrode 12, but are carried by the flow through the outlets 36 into the outlet channel 26. Although in the illustrated embodiment, both of these uses of catch tray 80 are shown, in various embodiments neither, either, or both of these additional catch trays 80 may be utilized. In other embodiments, not shown, the catch trays 80 may be positioned around other areas of the cell 10 that are prone to congestion by particulates. As a non-limiting example, wherein the flow of the ionically conductive medium is through a diffuser, such as is described in U.S. patent application Ser. No. 13/019,923, incorporated in its entirety herein by reference, catch trays 80 may be positioned around each of a plurality of diffuser openings. As another example, in an embodiment comprising one or more sensors in the cell 10, such as but not limited to a flow sensor, the cell 10 may comprise a catch tray 80 configured to prevent particulate buildup or congestion around the one or more sensors. Such a positioning of the catch trays 80 may prevent the particulates from damaging or preventing proper operation of those sensors.

Figure 17:
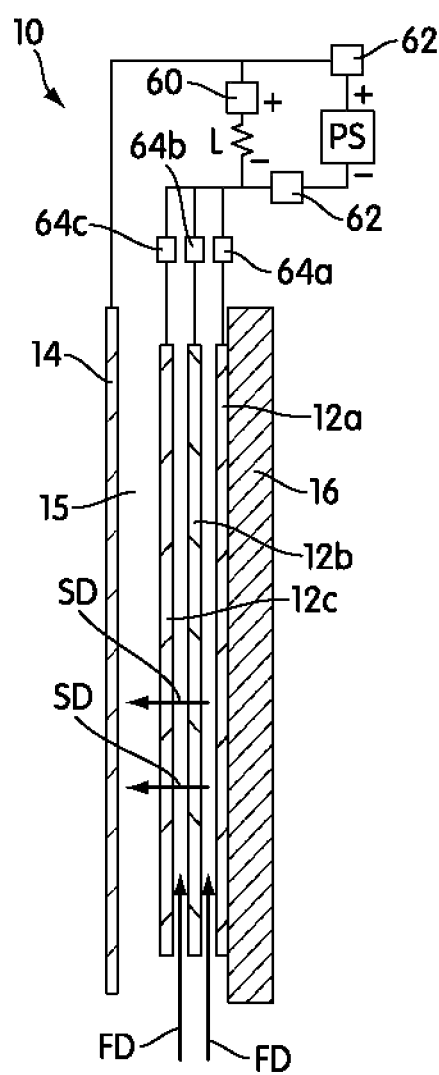
FIG. 17 schematically illustrates electrical connections between the electrochemical cell and an external load and a power supply according to an embodiment of the present invention.

As illustrated in FIG. 17, the fuel electrode 12 is connected to an external load L so that electrons given off by the fuel as the fuel is oxidized at the fuel electrode 12 flow to the external load L. In an embodiment, the external load L may be coupled to each of the permeable electrode bodies 12a-12c in parallel, as described in detail in U.S. patent application Ser. No. 12/385,489, filed on Apr. 9, 2009 and incorporated herein by reference. In other embodiments, the external load L may only be coupled to a terminal one of the permeable electrode bodies 12a-12c, so that growth may occur in series from between each of the permeable electrode bodies 12a-12-c.

The oxidant electrode 14 functions as a cathode when the oxidant electrode 14 is connected to the external load L and the cell 10 operates in discharge mode. When functioning as a cathode, the oxidant electrode 14 is configured to receive electrons from the external load L and reduce an oxidizer that contacts the oxidant electrode 14. In an embodiment, the oxidant electrode 14 comprises an air breathing electrode and the oxidizer comprises oxygen in the surrounding air.

The oxidizer may be delivered to the oxidant electrode 14 by a passive transport system. For example, where oxygen present in ambient air is the oxidizer, simply exposing the oxidant electrode 14 to ambient air via openings in the cell, such as the openings that are provided by grooves 54 in the cover 19 and grooves 56 in the electrode holder 16 provided in the center of the electrochemical cell system 100, may be sufficient to allow diffusion/permeation of oxygen into the oxidant electrode 14. Other suitable oxidizers may be used and embodiments described herein are not limited to the use of oxygen as the oxidizer. A peripheral gasket 15 may be positioned between the periphery of the oxidant electrode 14 and the cover 19 or electrode holder 16, as appropriate, to prevent the ionically conductive medium from leaking around the oxidant electrode 14 and into the area in the grooves 54, 56 for air exposure.

In other embodiments, a pump, such as an air blower, may be used to deliver the oxidizer to the oxidant electrode 14 under pressure. The oxidizer source may be a contained source of oxidizer. In an embodiment, the oxygen may be recycled from the cell 10, such as is disclosed in U.S. patent application Ser. No. 12/549,617, incorporated in its entirety herein by reference. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant electrode 14. Thus, the term "oxidizer source" is intended to encompass both contained oxidizers and/or arrangements for passively or actively delivering oxygen from ambient air to the oxidant electrode 14.

Electricity that can be drawn by the external load L is generated when the oxidizer at the oxidant electrode 14 is reduced, while the fuel at the fuel electrode 12 is oxidized to an oxidized form. The electrical potential of the cell 10 is depleted once the fuel at the fuel electrode 12 is entirely oxidized or oxidation is arrested due to passivation of the fuel electrode. A switch 60 may be positioned in between the oxidant electrode 14 and the load L so that the oxidant electrode 14 may be connected and disconnected from the load L, as desired.

To limit or suppress hydrogen evolution at the fuel electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Other additives may also or alternatively be added to the ionically conductive medium, including, but not limited to additives which enhance the electrodeposition process of the metal fuel on the fuel electrode 12, such as is described in U.S. patent application Ser. No. 13/028,496, incorporated in its entirety herein by reference. Again, as noted above, where some additives comprise metals (including but not limited to indium or bismuth) that are incorporated into the fuel during charging and may detach with the fuel during operation of the cell 10, the catch tray 80 may be positioned to contact and recover the additive back into its ionic form, to reduce additive waste or the potential of congestion by the disconnected metal particulates.

After the fuel in the cell 10 has been entirely oxidized, or whenever it is desirable to regenerate the fuel within the cell 10 by reducing the oxidized fuel ions back to fuel, the fuel electrode 12 and the oxidant electrode 14 may be decoupled from the external load L and coupled to a power supply PS with the use of suitable switches 62, as illustrated in FIG. 17. The power supply PS is configured to charge the cell 10 by applying a potential difference between the fuel electrode 12 and the oxidant electrode 14 such that the reducible species of the fuel is reduced and electrodeposited onto the permeable electrode bodies 12a-12c and the corresponding oxidation reaction takes place at the oxidant electrode 14, which is typically oxidation of an oxidizable species to evolve oxygen, which may be off-gassed from the cell 10. As noted above, and as described in detail in U.S. patent application Ser. No. 12/385,489, filed on Apr. 9, 2009 and incorporated herein by reference, only one of the permeable electrode bodies, such as 12a, may be connected to the power supply PS so that the fuel reduces onto the permeable electrode body and progressively grows to and on the other permeable electrode bodies 12b-12c, one by one. The switches 62 may control when the cell 10 operates in discharge mode and in charge mode. Additionally, further switches 64, including switches 64a-c, may be associated with each of the permeable electrode bodies 12a-c, so as to selectively determine if growth occurs in parallel, or progressively. In an embodiment, the switches 64a-c may selectively remove the electrical connection to one or more of permeable electrode bodies 12a-c.

Any suitable control mechanism may be provided to control the action of the switches 60, 62, and 64 between the open and closed positions. For example, a relay switch that is biased toward the open position may be used for switch 62, with an inductive coil coupled to the power supply that causes closure of the switch when charging begins. Further, a more complex switch that allows for individual connection to the permeable electrode bodies 12a-12c could be used to provide the connection/disconnection to and from the load, and to and from each other. In an embodiment, the control mechanism may be related to a high efficiency mode for the cell, such as is disclosed in U.S. patent application Ser. No. 13/083,929, incorporated in its entirety herein by reference.

Figure 18:
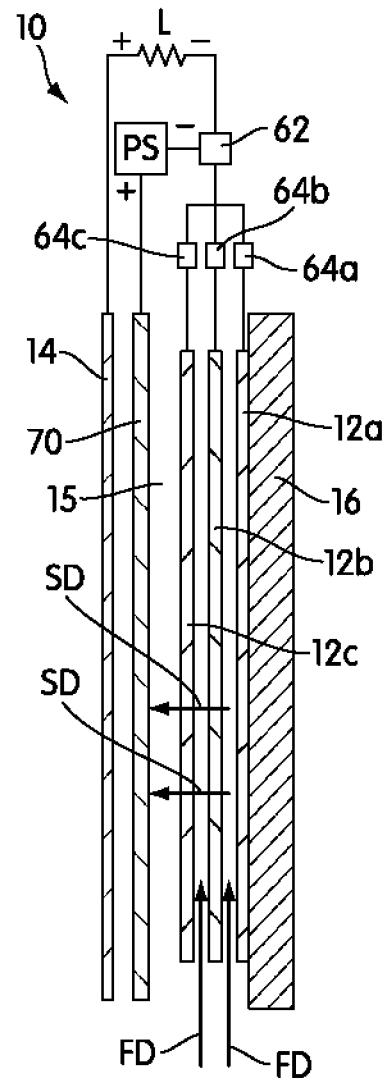
FIG. 18 schematically illustrates electrical connections between the electrochemical cell and an external load and a power supply according to an embodiment of the present invention.

FIG. 18 shows an embodiment where a separate charging electrode 70 is provided to function as the charging electrode, rather than the oxidant electrode 14. As illustrated in FIG. 3, the separate charging electrode 70 may be positioned between the fuel electrode 12 and the oxidant electrode 14, with a spacer 72 and the seal member 17 being positioned between the separate charging electrode 70 and the oxidant electrode 14. The spacer 72 is non-conductive and has openings through which the ionically conductive medium may flow.

In the embodiment described above with respect to FIG. 17, the oxidant electrode 14 functions as the cathode during power generation/discharge, and as the anode during charging, as described above. In FIG. 18, the load may be coupled in parallel to each of the permeable electrode bodies 12a-12c of the fuel electrode 12, and also to the separate charging electrode 70 during recharge. During current generation, the fuel on the fuel electrode 12 is oxidized, generating electrons that are conducted to power the load L and then conducted to the oxidant electrode 14 for reduction of the oxidizer (as discussed in more detail above).

It is also possible in any of the embodiments of the invention to apply the cathodic potential simultaneously to all the electrode bodies 12a-12c of the fuel electrode 12, rather than to just one to produce body-by-body progressive growth. Progressive growth emanating from one terminal is advantageous because it provides more density. Specifically, the growth in the previously connected electrode bodies continues as each subsequent body is connected by the progressing growth. With all the electrode bodies subject to the same potential, the growth will only occur until a short occurs between the charging electrode, which is the oxidant electrode 14 in the embodiment of FIG. 17 and the separate charging electrode 70 in the embodiment of FIG. 18, and the electrode body proximate to it. Thus, it is possible to have a faster, but less dense, growth in this manner, which may be amenable to certain re-charging needs.

The embodiments illustrated in FIGS. 17 and 18 should not be considered to be limiting in any way and are provided as non-limiting examples of how the cell 10 may be configured to be rechargeable. U.S. patent application Ser. No. 12/885,268, which has published as U.S. Patent Application Publication No. 2011/0070506, the entire content of which is incorporated herein by reference, describes embodiments of a rechargeable electrochemical cell system with charge/discharge mode switching in the cells.

Returning to FIG. 5, after the ionically conductive medium has passed through the fuel electrode 12, the medium may flow into the outlet channel 26 that is connected to the outlets 36 of the cavity 18 of the electrode holder 16 and the outlet 22. The outlet 22 may be connected to the inlet 20 in embodiments where the medium is recirculated in the cell 10, or to an inlet of an adjacent cell, as discussed in further detail below, when a plurality of cells 10 are fluidly connected in series. As noted above, in some embodiments, the catch tray 80 may be positioned beyond the fuel electrode 12, including but not limited to in the outlets 36, or in the outlet channel 26. In an embodiment, the outlet 22 may be connected to a vessel to collect the medium that has been used in the cell 10.

The cells 10 illustrated in the Figures may be fluidly connected in series. Details of embodiments of cells that are connected in series are provided in U.S. patent application Ser. No. 12/631,484, filed Dec. 4, 2009 and incorporated herein by reference in its entirety. The outlet 22 of a first cell 10 may be fluidly connected to the inlet 20 of a second cell 10, and the outlet 22 of the second cell 10 may be connected to the inlet 20 of a third cell, and so on. Although the embodiment of FIGS. 2, 3, 10, and 11 illustrate two cells 10, additional cells may be stacked and fluidly connected to the illustrated cells. Due to the meandering, tortuous paths that are created by the inlet channel 24 and the outlet channel 26, described above and illustrated in FIGS. 4, 5, and 12-16, the length of the flow passageways for the medium via the channels 24, 26 is greater than the distance between the fuel electrode 12 and the oxidant electrode 14 in each of the cells 10. This creates an ionic resistance between the pair of fluidly connected cells that is greater than an ionic resistance within an individual cell 10. This may reduce or minimize internal ionic resistance loss of the stack of cells 100, as discussed in U.S. patent application Ser. No. 12/631,484.

In operation, the fuel electrode 12, which already has metal fuel deposited thereon, is connected to the load L and the oxidant electrode 14 is connected to the load L. The ionically conductive medium enters the inlet 20 under positive pressure and flows through the inlet channel 24, the inlets 34 of the cavity 18, where it may flow into the fluidization zones 28 and/or through the catch trays 80. In some embodiments the ionically conductive medium may flow across the permeable electrode bodies 12a-12c in the flow lanes 42 defined by the elongated middle portions 22 of the spacers 40. The ionically conductive medium may also permeate through the permeable electrode bodies 12a-12c of the fuel electrode 12. The ionically conductive medium simultaneously contacts the fuel electrode 12 and the oxidant electrode 14, thereby allowing the fuel to oxidize and conduct electrons to the load L, while the oxidizer is reduced at the oxidant electrode 14 via the electrons that are conducted to the oxidant electrode 14 by the load L. After the ionically conductive medium has passed through the flow lanes 42, or through the cavity 18, the medium flows out of the cavity 18 via the outlets 36 of the cavity 18, through the outlet channel 24, and out the outlet 22 of the cell 10.

When the potential of the cell 10 has been depleted or when it is otherwise desirable to recharge the cell 10, the fuel electrode 12 is connected to the negative terminal of the power supply PS and the charging electrode, which is the oxidant electrode 14 in the embodiment illustrated in FIG. 17 and the separate charging electrode 70 in the embodiment illustrated in FIG. 18, is connected to the positive terminal of the power supply PS. In the charging or recharge mode, the fuel electrode 12 becomes the cathode and the charging electrode 14, 70 becomes the anode. By providing electrons to the fuel electrode 12, fuel ions may reduce into fuel and redeposit onto the permeable electrode bodies 12a-12c while the ionically conductive medium circulates through the cell 10 in the same manner as described above with respect to the discharge mode.

In some embodiments the flow lanes 42 may provide directionality and distribution of the ionically conductive medium across the fuel electrode 12. In some embodiments, the fluidization zones 28 may agitate the particulates and precipitates that have been formed during discharge mode of the cell 10 within the ionically conductive medium and prevent the particulates from settling out of the medium at the bottom of the cavity, which allows the particulates to flow with the ionically conductive medium across the fuel electrode 12. In embodiments comprising the flow lanes 42, the flow lanes 42 may also prevent the particulates from settling and/or covering the electrodes. When the cell 10 is in charging mode, the improved distribution of the particulates across the fuel electrode 12 allow for a more uniform deposition of the reduced fuel onto the fuel electrode 12, which improves the density of the fuel on the fuel electrode 12, and increases the capacity and energy density of the cell 10, thereby enhancing the cycle-life of the cell 10. In addition, by having the ability to control the distribution of the precipitates or reaction byproduct during discharge, early passivation/deposition of the by-product on the fuel electrode 12 may be prevented. Passivation leads to lower fuel utilization and lower cycle life, which is undesirable.

Embodiments of the present invention are not limited to the management of the reaction by-product that is generated during discharge mode, as described above, and reversibly reduced and electrodeposited as the fuel during recharge. Rather, embodiments of the present invention can be used where the reducible fuel species is different from the reaction by-product and is supplied separately.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. As a non-limiting example, in some embodiments the configuration of the cell 10 may be similar to those disclosed in U.S. patent application Ser. No. 12/385,217 or 12/776,962, each of which are incorporated herein by reference. Thus, the present invention is intended to encompass all modifications, substitutions, alterations, and equivalents within the spirit and scope of the following appended claims.

The subject matter claimed in this application was made under a joint research agreement qualifying under 35 U.S.C. §103 (c)(2) and (3) to which Fluidic, Inc. and Arizona Science and Technology Enterprises, LLC acting as the exclusive master licensee for Arizona State University are parties.

What is claimed is:

1. An electrochemical cell comprising:
   a fuel electrode comprising a metal fuel and a current collector;
   an oxidant electrode spaced from the fuel electrode;
   an ionically conductive medium for conducting ions between the fuel and oxidant electrodes to support electrochemical reactions at the fuel and oxidant electrodes;
   a catch tray consisting essentially of a catch tray body that is mounted and positioned within a flow path of the ionically conductive medium to be contacted by particulates of the metal fuel separating from the fuel electrode, the catch tray being disconnected from the current collector of the fuel electrode; and
   an electrode holder supporting the fuel electrode, the electrode holder comprising one or more recesses therein for receiving and securing a mounting portion of the catch tray;
   wherein the fuel electrode and the oxidant electrode are configured to, during discharge, oxidize the metal fuel at the fuel electrode and reduce an oxidant at the oxidant electrode to generate a discharge potential difference therebetween for application to a load; and
   wherein the catch tray body has a catalyst material for catalyzing, locally at the catch tray, oxidation of particulates of the metal fuel disconnected from the current collector of the fuel electrode and contacting the catch tray body, and reduction of cations in the ionically conductive medium.

2. The electrochemical cell of claim 1, further comprising a charging electrode selected from the group consisting of (a) the oxidant electrode, and (b) a separate charging electrode spaced from the fuel and oxidant electrodes.

3. The electrochemical cell of claim 2, wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

4. An electrochemical cell according to claim 3, wherein the fuel electrode comprises a series of permeable electrode bodies arranged in spaced apart relation;
wherein the spaced apart relation of the permeable electrode bodies enables the re-charge potential difference to be applied between the charging electrode and at least one of the permeable electrode bodies, with the charging electrode functioning as the anode and the at least one permeable electrode body functioning as the cathode, such that the reducible fuel species are reduced and electrodeposited as the metal fuel in oxidizable form on the at least one permeable electrode body, whereby the electrodeposition causes growth of the metal fuel among the permeable electrode bodies such that the electrodeposited metal fuel establishes an electrical connection between the permeable electrode bodies.

5. An electrochemical cell according to claim 1, wherein the catalyst material comprises nickel, platinum, palladium, rhodium, silver, gold, or titanium, or alloys, oxides, or ions thereof.

6. An electrochemical cell according to claim 1, wherein the catalyst material is formed by a plasma spray.

7. An electrochemical cell according to claim 1, wherein the catalyst material is formed by an electroplating process.

8. An electrochemical cell according to claim 1, wherein the catch tray is positioned along the flow path of the ionically conductive medium, wherein the catch tray is configured to prevent the particulates from gathering by a flow inlet, and wherein the catch tray is configured to allow the ionically conductive medium to flow therethrough.

9. An electrochemical cell according to claim 8, wherein the catch tray comprises a porous screen positioned between the flow inlet for the ionically conductive medium and the fuel electrode.

10. An electrochemical cell according to claim 9, wherein the porous screen comprises pores of approximately 0.01-1000 μm in size.

11. An electrochemical cell according to claim 1, wherein the metal fuel comprises zinc, and wherein precipitates of zinc in presence of the catalyst material oxidize to form a zinc ion, while hydrogen ions present in the ionically conductive medium reduce to form hydrogen gas.

12. An electrochemical cell according to claim 1, further comprising a plurality of the catch trays configured to contact particulates of the metal fuel throughout the flow path of the ionically conductive medium.

13. An electrochemical cell according to claim 12, wherein the plurality of the catch trays are positioned in at least one of a bottom of the cell, a fluid pipe defining the flow path, and a reservoir for storing an excess of ionically conductive medium connected along the fluid pipe.

14. An electrochemical cell according to claim 1, wherein the catch tray is positioned in spaced relation to the fuel electrode, such that particulates of the metal fuel separating from the fuel electrode fall under gravitational forces into contact with the catch tray.

15. An electrochemical cell according to claim 14, wherein the metal fuel comprises zinc, and wherein precipitates of zinc in presence of the catalyst material oxidize to form a zinc ion, while hydrogen ions present in the ionically conductive medium reduce to form hydrogen gas.

16. An electrochemical cell according to claim 1, wherein the catch tray body of the catch tray is positioned substantially perpendicular to the fuel electrode and extends into the flow path of the ionically conductive medium.

17. An electrochemical cell according to claim 16, wherein the mounting portion of the catch tray is substantially parallel to the fuel electrode, and thus substantially perpendicular to the catch tray body of the catch tray.

18. An electrochemical cell according to claim 1, wherein the catalyst material comprises a more noble metal than the metal fuel.

19. An electrochemical cell according to claim 1, wherein the electrochemical cell comprises an electrochemical configuration selected from the group consisting of lead-acid, nickel-zinc, nickel-cadmium, and zinc-bromine.

20. An electrochemical cell according to claim 13, further comprising a plurality of spacers spaced in relation to each other defining a plurality of flow lanes therebetween and across the cell, wherein each one of the plurality of catch trays are associated with an inlet of one of the plurality of flow lanes.

21. An electrochemical cell comprising:
a fuel electrode comprising a metal fuel and a current collector;
an oxidant electrode spaced from the fuel electrode;
an ionically conductive medium for conducting ions between the fuel and oxidant electrodes to support electrochemical reactions at the fuel and oxidant electrodes;
a catch tray consisting essentially of a catch tray body that is mounted and positioned within a flow path of the ionically conductive medium to be contacted by particulates of the metal fuel separating from the fuel electrode, the catch tray being disconnected from the current collector of the fuel electrode; and
an electrode holder supporting the fuel electrode, wherein a mounting portion of the catch tray is used to secure the catch tray to the electrode holder, and wherein the mounting portion of the catch tray is substantially parallel to the fuel electrode, and thus substantially perpendicular to the catch tray body of the catch tray;
wherein the fuel electrode and the oxidant electrode are configured to, during discharge, oxidize the metal fuel at the fuel electrode and reduce an oxidant at the oxidant electrode to generate a discharge potential difference therebetween for application to a load; and
wherein the catch tray body has a catalyst material for catalyzing, locally at the catch tray, oxidation of particulates of the metal fuel disconnected from the current collector of the fuel electrode and contacting the catch tray body, and reduction of cations in the ionically conductive medium.

22. The electrochemical cell of claim 21, further comprising a charging electrode selected from the group consisting of (a) the oxidant electrode, and (b) a separate charging electrode spaced from the fuel and oxidant electrodes.

23. The electrochemical cell of claim 22, wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

24. An electrochemical cell according to claim 23, wherein the fuel electrode comprises a series of permeable electrode bodies arranged in spaced apart relation;
  wherein the spaced apart relation of the permeable electrode bodies enables the re-charge potential difference to be applied between the charging electrode and at least one of the permeable electrode bodies, with the charging electrode functioning as the anode and the at least one permeable electrode body functioning as the cathode, such that the reducible fuel species are reduced and electrodeposited as the metal fuel in oxidizable form on the at least one permeable electrode body, whereby the electrodeposition causes growth of the metal fuel among the permeable electrode bodies such that the electrodeposited metal fuel establishes an electrical connection between the permeable electrode bodies.

25. An electrochemical cell according to claim 21, wherein the catalyst material comprises nickel, platinum, palladium, rhodium, silver, gold, or titanium, or alloys, oxides, or ions thereof.

26. An electrochemical cell according to claim 21, wherein the catalyst material is formed by a plasma spray or an electroplating process.

27. An electrochemical cell according to claim 21, wherein the catch tray is positioned along the flow path of the ionically conductive medium, wherein the catch tray is configured to prevent the particulates from gathering by a flow inlet, and wherein the catch tray is configured to allow the ionically conductive medium to flow therethrough.

28. An electrochemical cell according to claim 27, wherein the catch tray comprises a porous screen positioned between the flow inlet for the ionically conductive medium and the fuel electrode.

29. An electrochemical cell according to claim 28, wherein the porous screen comprises pores of approximately 0.01-1000 μm in size.

30. An electrochemical cell according to claim 21, wherein the metal fuel comprises zinc, and wherein precipitates of zinc in presence of the catalyst material oxidize to form a zinc ion, while hydrogen ions present in the ionically conductive medium reduce to form hydrogen gas.

31. An electrochemical cell according to claim 21, further comprising a plurality of the catch trays configured to contact particulates of the metal fuel throughout the flow path of the ionically conductive medium.

32. An electrochemical cell according to claim 31, wherein the plurality of the catch trays are positioned in at least one of a bottom of the cell, a fluid pipe defining the flow path, and a reservoir for storing an excess of ionically conductive medium connected along the fluid pipe.

33. An electrochemical cell according to claim 21, wherein the catch tray is positioned in spaced relation to the fuel electrode, such that particulates of the metal fuel separating from the fuel electrode fall under gravitational forces into contact with the catch tray.

34. An electrochemical cell according to claim 33, wherein the metal fuel comprises zinc, and wherein precipitates of zinc in presence of the catalyst material oxidize to form a zinc ion, while hydrogen ions present in the ionically conductive medium reduce to form hydrogen gas.

35. An electrochemical cell according to claim 21, wherein the catch tray body of the catch tray is positioned substantially perpendicular to the fuel electrode and extends into the flow path of the ionically conductive medium.

36. An electrochemical cell according to claim 21, wherein the catalyst material comprises a more noble metal than the metal fuel.

37. An electrochemical cell according to claim 21, wherein the electrochemical cell comprises an electrochemical configuration selected from the group consisting of lead-acid, nickel-zinc, nickel-cadmium, and zinc-bromine.

38. An electrochemical cell according to claim 32, further comprising a plurality of spacers spaced in relation to each other defining a plurality of flow lanes therebetween and across the cell, wherein each one of the plurality of catch trays are associated with an inlet of one of the plurality of flow lanes.

* * * * *